United States Patent [19]
Ostler

[11] Patent Number: 5,214,658
[45] Date of Patent: May 25, 1993

[54] MIXED GAS ION LASER

[75] Inventor: Kevin D. Ostler, Salt Lake City, Utah

[73] Assignee: Ion Laser Technology, Salt Lake City, Utah

[21] Appl. No.: 964,724

[22] Filed: Oct. 22, 1992

Related U.S. Application Data

[63] Continuation-in-part of Ser. No. 921,469, Jul. 30, 1992, abandoned, which is a continuation of Ser. No. 686,664, Apr. 17, 1991, abandoned, which is a continuation-in-part of Ser. No. 558,776, Jul. 27, 1990, abandoned.

[51] Int. Cl.$^5$ ............................................. H01S 3/10
[52] U.S. Cl. ....................................... 372/23; 372/39; 372/59; 372/33; 372/19
[58] Field of Search ...................... 372/23, 59, 68, 39, 372/99, 19

[56] References Cited

U.S. PATENT DOCUMENTS

| | | | |
|---|---|---|---|
| Re. 31,279 | 6/1983 | Mefferd et al. ............... | 372/107 |
| 3,605,039 | 9/1971 | Harris .......................... | 331/94.5 |
| 3,801,202 | 4/1974 | Breaux ......................... | 356/85 |
| 3,962,656 | 6/1976 | Peressini ...................... | 331/94.5 PE |
| 3,967,214 | 6/1976 | Thatcher ...................... | 372/38 |
| 3,970,962 | 7/1976 | Peressini et al. ............. | 331/94.5 PE |
| 4,007,430 | 2/1977 | Fletcher et al. .............. | 372/37 |
| 4,053,845 | 4/1977 | Gould .......................... | 330/4.3 |
| 4,061,986 | 12/1977 | Barker ......................... | 331/94.5 |
| 4,161,436 | 7/1979 | Gould .......................... | 204/157.1 |
| 4,477,907 | 10/1984 | McMahan ..................... | 372/64 |
| 4,479,225 | 10/1984 | Mohler et al. ................ | 372/97 |
| 4,611,327 | 9/1986 | Clark et al. .................. | 372/57 |
| 4,611,327 | 9/1986 | Clark et al. .................. | 372/58 |
| 4,615,033 | 9/1986 | Nakano et al. ............... | 372/99 |
| 4,615,034 | 9/1986 | von Gunten et al. ......... | 372/99 |
| 4,635,272 | 1/1987 | Kamide et al. ............... | 372/87 |
| 4,674,092 | 6/1987 | Cannon ........................ | 372/59 |
| 4,686,685 | 8/1987 | Hoag ........................... | 372/107 |
| 4,696,010 | 9/1987 | Eastman ...................... | 372/34 |
| 4,698,835 | 10/1987 | Ono et al. .................... | 378/136 |
| 4,704,583 | 11/1987 | Gould .......................... | 330/4.3 |
| 4,713,825 | 12/1987 | Adsett ......................... | 372/107 |
| 4,716,569 | 12/1987 | Bees ............................ | 372/38 |
| 4,817,096 | 3/1989 | Nighan et al. ................ | 372/5 |
| 5,005,181 | 4/1991 | Yoshioka et al. ............. | 372/57 |
| 5,055,743 | 10/1991 | Ekstrand ...................... | 315/111.51 |
| 5,127,730 | 7/1992 | Brelje et al. .................. | 356/318 |
| 5,149,659 | 9/1992 | Hakuta et al. ................ | 372/59 |

Primary Examiner—Léon Scott, Jr.
Attorney, Agent, or Firm—Madson & Metcalf

[57] ABSTRACT

A laser that is capable of producing light from a chosen group of frequencies not adequate or available using a single gas laser is provided. The laser is capable of producing selected and well defined light wavelengths. The laser is also capable of eliminating unwanted frequencies in order to prevent such frequencies from competing with (robbing power from) the desired wavelengths. The laser constitutes a multiple gas laser. A combination of argon and krypton is used. Argon is known to produce a good blue laser beam in the area of 488 nm. Mixed with the argon is krypton. Krypton also produces a blue output at 482 nm and 476 nm. In addition, krypton produces strong outputs in red, yellow, and green wavelengths (647 nm, 568 nm, and 529 nm respectively). Accordingly, access to each of these colors is provided by the argon-krypton in the mixture. Certain light frequencies are unnecessary and undesirable. Elimination of undesirable wavelengths is accomplished primarily through the optics used. Optics are chosen which transmit unwanted wavelengths. As a result no lasing action takes place at the unwanted wavelengths.

24 Claims, 7 Drawing Sheets

MIXED GAS ION LASER

RELATED APPLICATIONS

This application is a continuation-in-part of applicant's copending application Ser. No. 07/921,469, filed Jul. 30, 1992 now abandoned; which is a continuation of application Ser. No. 07/686,664, filed Apr. 17, 1991 now abandoned; which was a continuation-in-part of application Ser. No. 07/558,776, filed Jul. 27, 1990 now abandoned. Each of those applications are incorporated herein by this reference.

BACKGROUND

1. Field of the Invention

The present invention is related to an ion laser which is capable of producing light from a chosen group of wavelengths, said group of wavelengths not being available using lasers employing a single gas. More particularly, the present invention is related to a compact, continuous output, ion laser which employs a combination of gases, such as argon and krypton gases, such that a controlled laser output of multiple wavelengths can be produced by a single laser.

2. Background of the Invention

Lasers are used extensively in industry, science, and entertainment. It will be appreciated that lasers are found to be particularly useful because of their ability to produce a coherent beam of intense light. For many applications it is desirable to produce light having a certain dependable and reproducible wavelength.

One type of laser that has achieved widespread acceptance is the ion laser. Among other factors, the ion laser is often preferred because of its potential to be compact in size and inexpensive to manufacture. In essence, the ion laser operates by exciting a gas contained within a tube in order to produce an emission of photons of a particular discrete wavelength. In the typical ion laser, atoms are excited by electrical discharge to an excited ion state. The excited atoms, being inherently unstable, have a tendency to return to a lower energy state. Accordingly, photons of specific frequencies are emitted by the electrically excited atoms in order for those atoms to return to a stable energy state. During this process both heat and light energy are produced.

The basic ion laser consists of three primary components. These include a resonator, a laser tube (plasma tube), and a power supply. The resonator generally holds two reflective surfaces, such as mirrors, in alignment. The mirrors then define the "optical cavity" or the area in which the laser beam is generated. In the typical ion laser, one of the mirrors is essentially totally reflective of light in the desired wavelengths. This mirror is often referred to as a high reflector. The other mirror (output coupler), is partially transmissive of the subject frequency in order to allow a fraction of the light energy stored in the optical cavity to escape. The escaping energy constitutes the output laser beam.

The laser tube provides optical gain within the resonator, causing it to act as an oscillator of the desired light frequency. Among other factors, the gain provided by the laser tube depends on the reflectivity and dimensions of the resonator, the spacings and lifetimes of the energy states of the gas ions within the tube, the number of gas ions present per unit volume, the ambient temperature, the gas temperature, energy-state-related interactions between different types of ions when more than one gas is present, and the frequency, voltage, and direction of the electrical discharge which is impressed on the gas. The laser power supply provides electrons which may be used to excite gas ions in the laser tube, thereby stimulating emissions. Direct current provides a sustained arc discharge through the gas of the laser tube, thereby permitting a continuous laser discharge, unlike the pulsed output produced by excimer or most ruby lasers. To produce lasing, however, rather than mere radiation, the power supply must also ensure that the electrons provided have a particular frequency and direction.

In the discharge, the ionized atoms of the gas are excited through multiple collisions with accelerated electrons. As mentioned above, ion lasers often use noble gases such as krypton and argon in the laser tube. Thus, stimulated emission from the various excited states to the ground state of the ionized argon or krypton atom produces the required lasing action. Depending on physical conditions of the discharge, a fraction of the noble gas atoms may be double ionized. Stimulated emission from these states occur as well giving rise to multiple frequency output.

During operation of an ion laser, the photons emitted during an induced transition of the type mentioned above, have the same phase and direction as the inducing electron wave (i.e., they are coherent with the wave that induces the transition). A single atom may radiate a photon in any direction. However, many atoms distributed over a finite volume (within the laser tube), and radiating coherently, cooperate to generate a wave having the same propagation vector as the inducing wave, within the limits of a diffraction pattern. That is, they amplify the inducing wave.

Thus, the radiation from induced emission has a spectral distribution identical to that of the inducing radiation. It is found that certain types of atoms produce certain specific wavelengths of radiation during the energy transition and emission of photons. For example, argon, a common substance for use in an ion lasing medium, produces approximately nine primary wavelengths of radiation. The most commonly used wavelengths for laser purposes are at approximately 488 nm and 514 nm. Krypton, another gas used in ion lasers, also produces distinct wavelengths of radiation, including radiation at approximately 647 nm, 568 nm, 530 nm, and 520 nm. It will be appreciated that once a distinct wavelength of radiation is isolated, it can be used to produce a lasing action as it oscillates through the optical cavity.

For some applications, it is desirable to have more than a single output frequency and it is particularly useful to have output from the laser in both the blue wavelengths, and at least one other usable wavelength. For example, the combinations of blue and yellow and blue and red are found to be particularly useful.

One context in which multiple wavelength laser outputs are desired is in the area of scientific research. For example, it has been found that laser produced light is capable of causing certain microscopic structures to fluoresce after being stained with a selected dye. Certain structures fluoresce under blue laser radiation, while other structures fluoresce under red or yellow radiation. Thus, it would often be useful to have the capacity to direct laser produced light of multiple wavelengths onto a particular microscopic sample of interest. Thus, distinct structures could be simultaneously viewed, studied, and compared without the need to switch lasers or to focus multiple lasers.

Until now, however, it has been impractical to employ conventional lasers in this context. In order to make this type of use practical it is necessary to provide a laser which produces a constant output and which is sufficiently portable to attach to a microscope or similar apparatus. Known multiple output lasers, are very generally large, expensive and water cooled. Thus, it is impractical to use that type of laser in the context of a microscope.

Other problems, such as difficulty in adjustment and the production of different colored output beams of widely varying power also limit the usefulness of existing lasers. Employing known technology it is difficult to select output power, particularly where more than one frequency is involved, because output power depends on numerous parameters which are not easily adjustable in combination in previous systems. Thus, it would be an advancement in the art to increase control over the gas pressure, operating current (and discharge voltage), and relative percentages of each gas in the laser tube.

Laser beams of specific colors have also been found useful in the printing industry. In the area of color separation it is often desirable to have the capability of irradiating a piece of work with both red and blue light. Other colors may also be useful in certain situations. This reduces the number of steps and the complexity of the color separation process. Again, however, the limitations of existing lasers make the use of lasers in printing less than totally desirable, particularly since it is often necessary to use multiple lasers.

In the study of flow dynamics, lasers of particular wavelengths may have great usefulness. One technique which has employed lasers is "Laser Doppler Velocimetry." Using multiple colored laser light, it would be possible to obtain extensive data concerning flow dynamics and to track multiple variables. Such techniques would be useful, for example, in the production and design of aircraft. Thus, it will be appreciated that portable, constant output, ion lasers which could also produce multiple colored outputs would be very useful.

In order to achieve multiple colored laser beams of specific wavelengths, it is conventional in the art to employ multiple lasers. It has been found useful to provide an argon laser and a helium-neon laser together such that the blue produced by the argon laser and the red produced by the helium-neon laser will both be available.

Problems with this approach are obvious and have been mentioned briefly above. It is necessary to align two separate and distinct lasers. Alignment of the lasers is critical to the applications discussed above. Yet, in using multiple lasers to produce each individual desired color, it is virtually impossible to produce a coaxial output beam. Thus, alignment problems continue to plague the user.

Prior attempts to produce a multiple color output laser have been less than satisfactory in that specific, selected wavelengths have not been available. Rather, many such lasers produce a broad band of wavelengths which may be only marginally useful. At the same time it was not possible to precisely control the output power of the desired frequencies. Thus, production of a usable multiple frequency output beam has been difficult.

Another problem is the production of undesirable colors. As mentioned above, conventional multiple color lasers produce a wide spectrum of output frequencies, including frequencies which may degrade desired output. In the case of a krypton laser, light of at least seven separate and distinct wavelengths is produced. Many of these wavelengths may not be needed or wanted for a particular application. Accordingly, these wavelengths will reduce the power output of the laser for the desirable wavelengths. This problem is multiplied when multiple lasers are combined.

Accordingly, it would be an advancement in the art to provide a mechanism for producing multiple colors of laser light while avoiding the problems encountered in the art. More particularly, it would be an advancement in the art to provide a single, continuous output, ion laser that was able to produce multiple specific wavelengths of light. It would be a related advantage to produce such an ion laser that did not require complex and tedious alignment procedures in order to produce the desired multiple light wavelengths, in that a multiple color coaxial output beam was produced. It would also be an advancement in the art to produce such a device that was capable of eliminating unwanted light wavelengths. It would be another advancement in the art to produce such an ion laser that was portable and inexpensive to manufacture.

Such an apparatus is disclosed and claimed herein.

BRIEF SUMMARY AND OBJECTS OF THE INVENTION

The present invention is related to an ion laser that is capable of producing multiple output wavelengths from a chosen group of wavelengths. More particularly, the present invention is related to production of such an ion laser that is capable of producing selected and well defined light wavelengths. The laser is also capable of eliminating unwanted wavelengths in order to prevent such wavelengths from robbing power from the desired wavelengths. Using the present invention it is simple to adjust and select the specific desired output wavelengths and output power by adjusting and selecting easily manageable operating parameters. These parameters include, for example, pressure within the laser tube, the percentage composition of each gaseous component, and operating current.

In one preferred embodiment of the present invention, a combination of argon and krypton is used within the laser tube. Argon is known to produce a good blue laser output in the 488 nm region. Blue is difficult to produce using many other laser media, including specifically krypton. Accordingly, the ability of argon to produce a blue output beam is of particular importance. Krypton also produces a blue output at 482 nm and 476 nm. However, the output of blue by krypton is found to be insufficient for many applications.

Krypton in the ion laser environment, however, also produces strong outputs in red, yellow, and green wavelengths (647 nm, 568 nm, 530 and 520 nm respectively). Accordingly, access to each of these wavelengths is provided by the krypton-argon the mixture. In particular, the mixture provides for simultaneous outputs in the red, yellow, and blue wavelengths, the most commonly used frequencies.

As was mentioned above, certain light wavelengths are unnecessary and undesirable. Production of these wavelengths will rob power from the desired wavelengths. For example, it may not be necessary or desirable to produce a green output beam. The present invention, therefore, eliminates the undesirable wavelengths primarily through the optics used.

If it is found that green (520 nm) is undesirable in a particular operating environment, optics may be chosen which transmit green. Typically optics are chosen which transmit at least five percent (5%) and preferably more than twenty percent (20%) of the green, or other undesirable wavelength. At this level of transmission, little if any lasing action takes place and the green is eliminated from the resulting output beam.

The optics are chosen such that they reflect most of the desired wavelengths. For example, in one embodiment, the optics will transmit in excess of 20% of the green wavelengths, while reflecting in excess of 99% of the desirable red, yellow, and blue wavelengths. Thus, laser output is obtained in the red, yellow, and blue regions, but is prevented in the green region.

Using the present invention the percentage of each output wavelength can be selected by specifically selecting and adjusting the gas mix, the pressure within the laser tube, and the voltage and current. These three parameters influence most of the factors which control the output from the laser tube. Altering the gas mixture affects the spacings and lifetimes of the energy states of the gas ions within the tube, as well as the energy-state-related interactions between ions of different gases. Altering the gas pressure affects both the distance between gas ions and the total number of ions available to emit photons. Altering current affects the number of electrons available to excite gas ions.

In short, control over the gas mixture, gas pressure, and discharge current is important in view of the expected uses of the device. In many such uses it is desired to have an output beam which is comprised of several colors, each of approximately equal power. In many scientific applications, for example, outputs of blue, red, and yellow of approximately 5 mW are preferred. As will be discussed in additional detail below, if output of each of three colors of about 5 mW is desired, it is a simple matter, using the present invention, to adjust the composition of the gas mixture, the pressure in the laser tube, and the current in order to achieve the desired output.

The present invention is easier to manufacture because of its ability to select the output. Furthermore, the device can easily be manufactured such that it is portable and can be air cooled rather than water cooled. This increases its usefulness in many settings, such as use in conjunction with a microscope or other delicate instrumentation. The present invention is also operable over a broad temperature range.

At the same time, the present invention produces a multicolored output which is coaxial. That is, there is a single output laser beam which contains multiple colors. Thus, it is not necessary to align multiple output beams in order to have access to multiple colored laser beams.

Accordingly, it is a primary object of the present invention to provide a mechanism for producing multiple colors of laser light while avoiding the problems encountered in the art.

More particularly, it is a primary object of the present invention to provide a single mixed gas ion laser that is able to produce multiple specific wavelengths of light output.

It is a related object of the invention to provide an ion laser that does not require complex and tedious alignment procedures in order to produce the desired multiple light wavelengths.

It is also an object of the present invention to produce such a device which is capable of eliminating unwanted light wavelengths.

These and other objects of the present invention will become apparent upon reading the following detailed description and appended claims, and upon reference to the accompanying drawings.

DETAILED DESCRIPTION OF THE PREFERRED EMBODIMENTS

Figure 1:
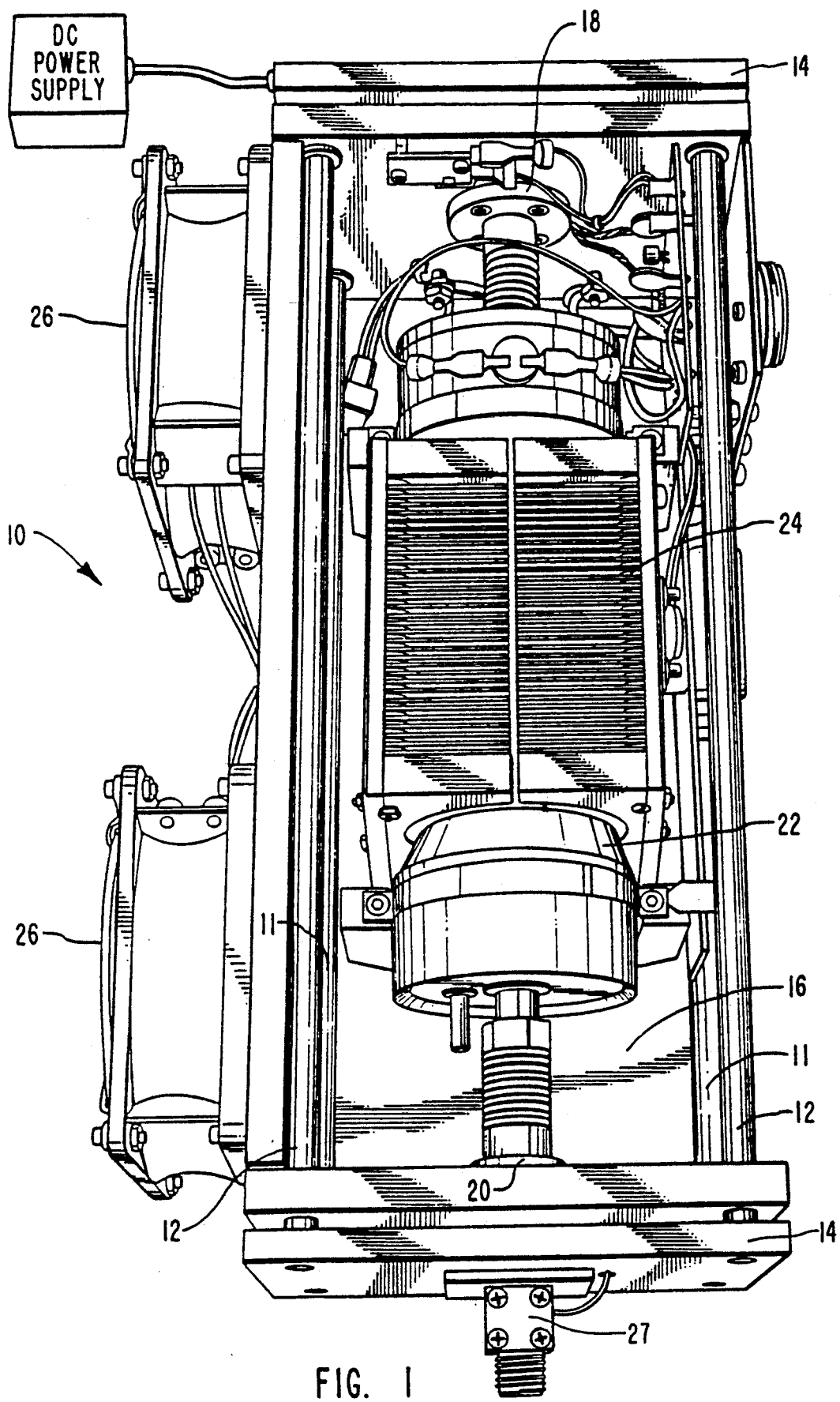
FIG. 1 is a perspective view of the interior of an ion laser.

The present invention can be more fully appreciated with reference to the drawings where like numerals designate like parts throughout. Referring now to FIG. 1, an ion laser resonator is illustrated and designated 10. While a laser resonator 10 is used to illustrate the operation of the present invention, it will be appreciated that the present invention could be advantageously employed in a wide variety of different ion laser configurations.

The resonator 10 is constructed of at least two spaced longitudinal members which are shown in FIG. 1 in the form of a set of rods. As illustrated the rods run the approximate length of the resonator 10. In the illustrated embodiment there are four rods, comprising a pair of lower rods 11 and a pair of upper rods 12, and form the structural foundation of the resonator 10.

The rods 11 and 12 are joined together to form an integral structure by at least one spaced transverse member. In the illustrated embodiment there are a pair of end plates 14 which form the space transverse members. When the rods 11 and 12 are securely attached to the end plates 14, a laser cavity 16 is formed in the spaced defined by the rods 11 and 12 and the end plates 14.

The end plates 14 form the basis for supporting the primary optical elements of the laser. The end plate 14 on one end of the resonator 10 acts as means for supporting a mirror 18, whose operation will become more fully apparent from the discussion below. The end plate 14 on the opposite end of the resonator 10 serves as a support for an output mirror 20, or other similar optical element.

Located within the interior of the laser cavity 16 is an ion laser plasma tube 22. In one embodiment of the device, the plasma tube 22 is constructed of ceramic and metal capable of high temperature cycling. The bore material may be any type of acceptable material, such as beryllium oxide. Beryllium oxide is found to have high thermal conductivity and low sputtering characteristics and is, therefore, useful for this purpose.

It will be appreciated that the light beam necessary to produce the lasing action is achieved within the laser tube 22. As is well known in the art, ion lasers operate by exciting atoms or ions, such as argon, and then causing those ions to emit photons as they again return to the lower energy state. The emission of photons of a chosen frequency results in a coherent polarized light beam that can form the basis of the lasing action. This is achieved by means well known in the laser art, particularly means for producing a voltage in the laser tube as will be discussed in additional detail below.

Also illustrated in FIG. 1 is a mechanism for radiating heat generated by the operation of the laser tube 22, in the form of a copper heat sink 24. It may also be desirable to employ one or more fans 26 to cause cool air to flow over the heat sink 24 in order to carry accumulated heat away from the laser tube 22. The heat sink 24 is structured such that it exposes a large amount of surface area while occupying only a small space within the interior of the laser cavity 16.

Figure 2:
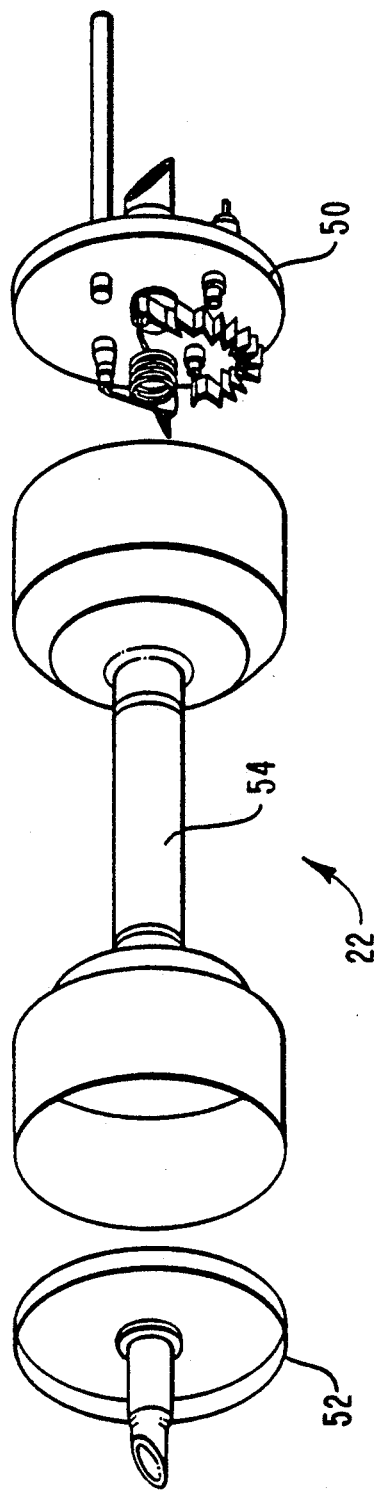
FIG. 2 is a perspective view of one acceptable embodiment of a laser tube within the scope of the present invention.

FIG. 2 illustrates the general construction of the laser tube 22 employed in a representative embodiment of the present invention. The cathode cap 50 is illustrated as being removed from the tube and the cathode end cap weld assembly is illustrated. On the opposite end of the laser tube 22, the anode end cap 52 weld assembly is illustrated. The laser tube 22 and its component parts are constructed in the same general manner as known ion lasers.

The bore braze assembly 54 is illustrated in the center of FIG. 2. In one embodiment of the device the bore is constructed such that it is approximately 0.050 inches in diameter and 3.0 inches in length. The manner of construction of laser bores is known to those skilled in the art.

Figure 3:
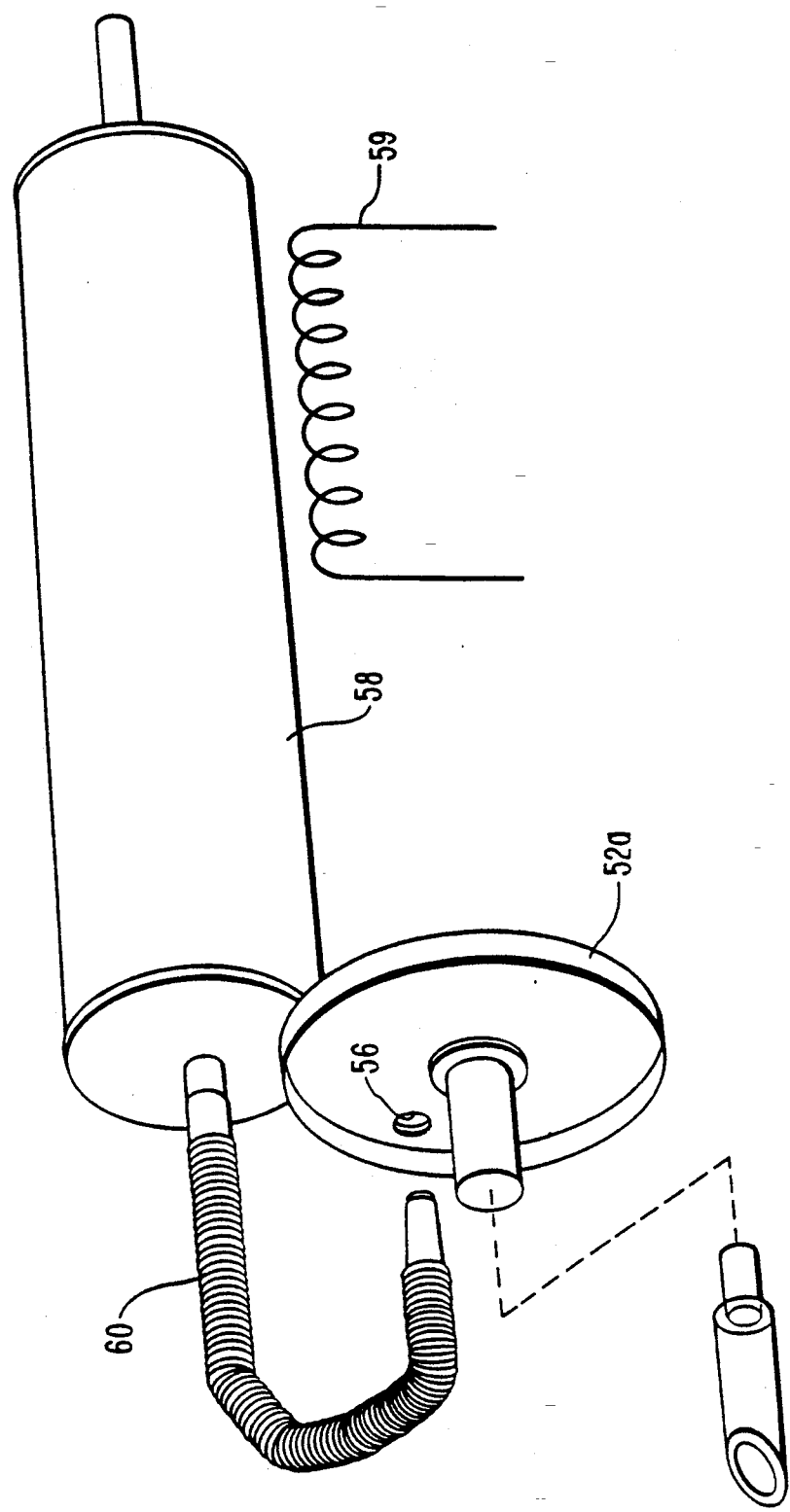
FIG. 3 is a perspective view of a gas reservoir for use in conjunction with the laser tube illustrated in FIG. 2.
Figure 5:
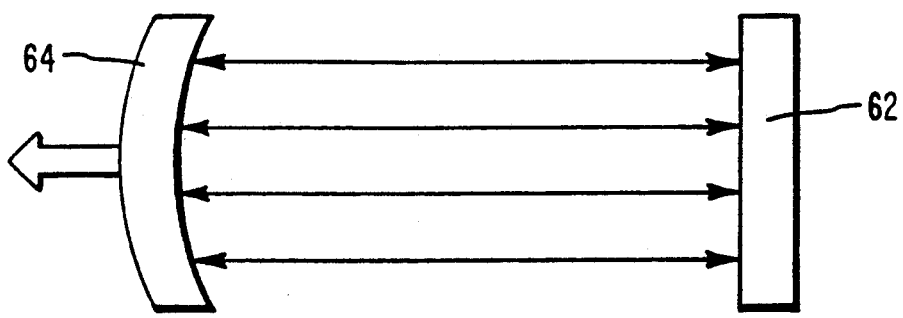
FIG. 5 is a graphical representation of one embodiment of the optics usable within the scope of the present invention.

FIG. 3 is an illustration of an optional auxiliary gas reservoir 58 which is placed in fluid communication with the interior of the laser tube 22. The anode end cap weld assembly 52a is illustrated and is essentially the same piece as is illustrated in FIG. 5. The primary difference is the addition of portal 56 which is attached to the gas reservoir by means of tube 60. Thus, an additional source of gas is provided for feeding the laser tube 22.

As discussed above, one of the important features of an ion laser is a power supply. As with conventional ion lasers, commercially available power supplies and other electronics may be employed within the present invention. The direct current power supply 23 illustrated in FIG. 1 provides the electrons required to drive the ion laser.

Figure 4:
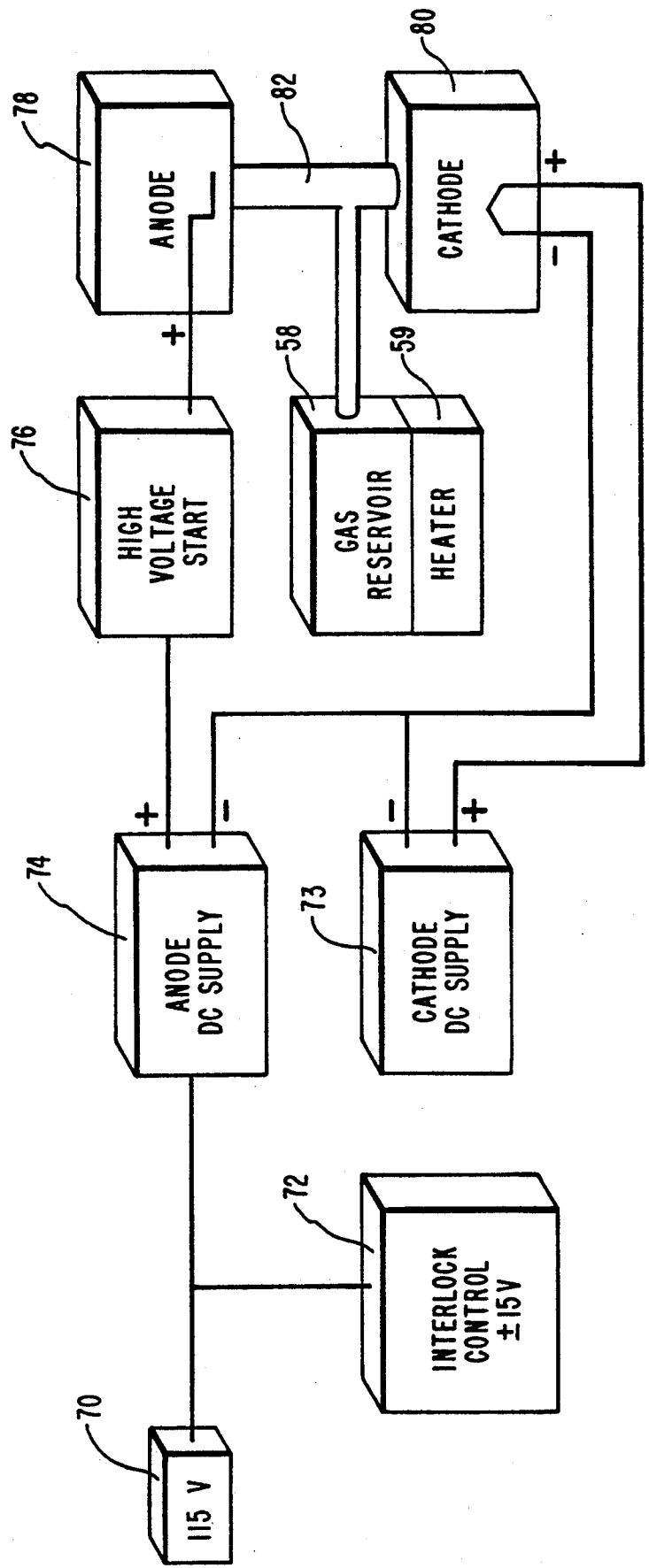
FIG. 4 is a schematic representation of one embodiment of the electronics of the present invention.

FIG. 4 is a schematic representation of one preferred embodiment of the electronics employed within the present invention. A conventional power source 70 preferably supplies 115 V to the ion laser through a plus-or-minus 15 V interlock control 72. Power supplies of this type are readily available commercially. An anode DC supply 74 in communication with the power source 70 preferably supplies 1 KW through a high voltage start 76 to the anode 78.

A cathode DC supply 73 preferably supplies 50 W to the cathode 80, thereby causing the emission of electrons into the bore of the laser tube 82 in order to produce lasing. Supplying electrons to the cathode 80 through a DC supply 73 rather than an AC supply significantly reduces noise in the plasma tube cause by the AC field, thereby improving the quality of the laser output.

It will be appreciated that there is not necessarily a linear relationship between current and voltage in the laser tube. Generally, devices such as the present laser apparatus operate like a diode. Voltage depends on the gas mixture, gas pressure, and the resistance of the tube, as well as current supplied through the direct current power supply. The current conversely is adjusted by adjusting the power supply by conventional current adjustment means contained on the power supply, such as adjustment knobs and the like. Thus, the ultimate output of the laser is adjusted by setting the light feedback level provided by the output detector 27 changing the current, which in turn results in an adjustment of the voltage to the laser tube 82.

Referring once again to FIG. 1, in operation a light beam is produced by the laser tube 22. That light beam exits the laser tube 22 at either end along the optical axis formed by the bore of the laser tube. For ease of discussion it will be assumed that the beam travels first in the direction of the mirror 18. Once the laser beam encounters mirror 18 it is reflected back along the optical axis (the horizontal axis of the laser cavity 16). The beam travels back into the laser tube 22 through the bore of the tube, initiating additional photon emission within the tube. The beam then continues out of the tube in the direction of the output mirror 20.

In the case of light of unwanted wavelengths, the output mirror transmits a high percentage (over 5%, or sufficient transmission to eliminate lasing action) of the light. Thus, much of the light of unwanted wavelengths does not travel back through the laser tube, but exits the device. Accordingly, no lasing action takes place with respect to these unwanted wavelengths.

This is accomplished by design of the optics of the laser. FIG. 5 is a schematic representation of one preferred embodiment of the optics. As illustrated in FIG. 5, one end of the laser cavity is defined by a flat high reflector 62. High reflector 62 reflects essentially all of the light that strikes the mirrored surface of reflector 62. The opposite side of the laser cavity is defined by a partially reflecting output mirror 64. Light is shown traveling through the area defined by high reflector 62 and output mirror 64, with a certain portion of the light exiting through output mirror 64.

In one preferred embodiment, output mirror 64 is comprised of an interior surface representing a one meter concave mirror and an exterior surface of a 31.5 cm convex mirror. The exterior surface aids in converging the beam as it exits the laser. The output mirror is also constructed such that it transmits a high percentage of unwanted light wavelengths. For example, for most applications it is desirable to eliminate the green wavelengths. This is accomplished by known coating technology. Generally an ion beam deposit of an oxide coating is applied which reflects desirable wavelengths and transmits undesirable wavelengths, such as those in the green wavelengths.

In one embodiment, optics are constructed whereby the transmission for the 488 nm blue light is approximately 1.5%. Transmission for the 568 nm yellow band is approximately 0.5% and transmission for the 647 nm red band is approximately 0.5%. Thus, a very high percentage of these wavelengths are reflected, resulting in efficient lasing action. At the same time, transmission of the 520-530 green bands is over 10%. Accordingly, there is insufficient reflection of the green wavelengths to provide adequate lasing action.

Optics of the type discussed are commercially available from several suppliers. For example, such optics are manufactured by PMS (Particle Measuring Systems), Spectra-Physics Lasers, and Coherent Laser Group. Typical optics used for the applications described herein would have the following percentage transmissions at the following wavelengths:

| Percent Trans. | Wavelength |
|---|---|
| 0.5 | 480 nm |
| 0.7-1.0 | 568 nm |
| >10.0 | 530 nm |
| 0.5 | 647 nm |

Figure 6:
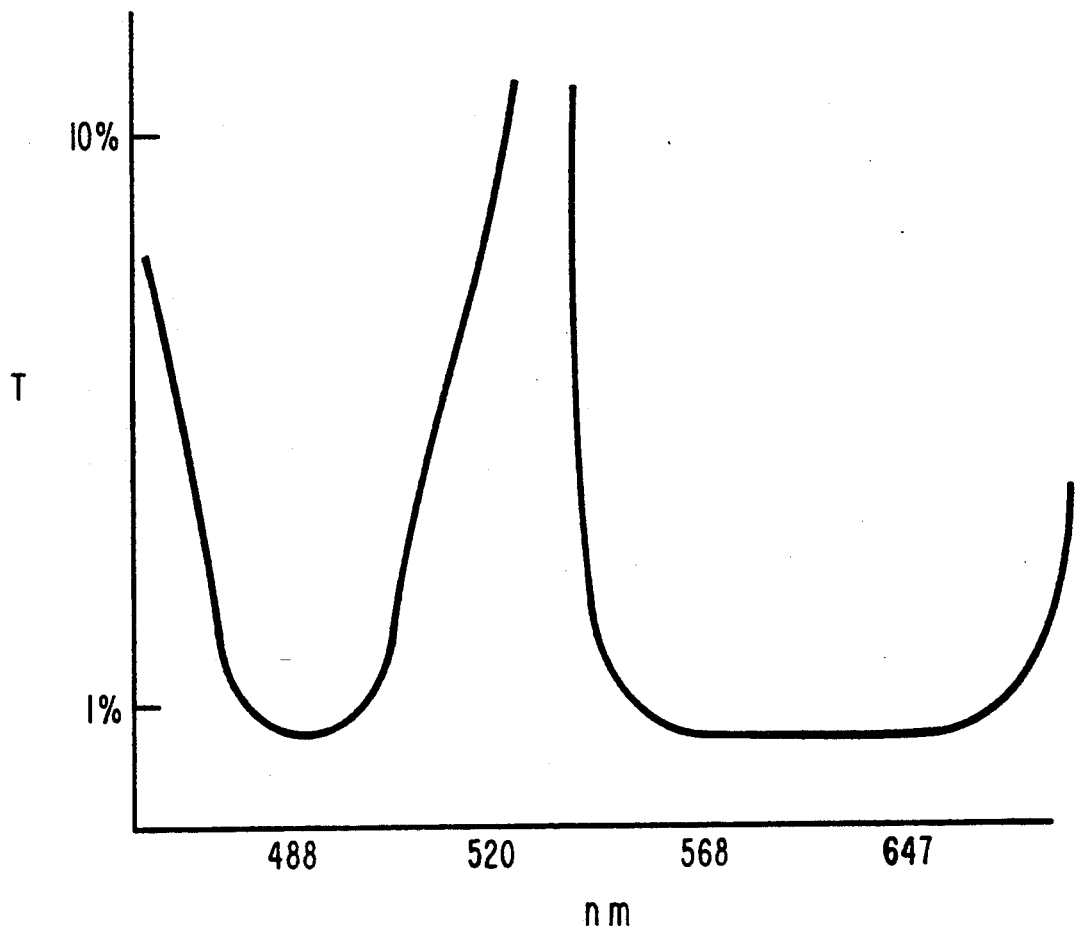
FIG. 6 is a graph showing acceptable transmission characteristics of the optics of the present invention.

The general performance of such a set of optics is graphically illustrated in FIG. 6. In FIG. 6 transmission is plotted on the vertical axis and wavelength is plotted on the horizontal axis. It can be seen that transmission for the desirable blue, red and yellow wavelengths is low, whereas transmission for the undesirable green wavelengths is high. The vast majority (over 99%) of the light of the selected desirable wavelengths is then directed back into the device, where the process is repeated numerous times. It will be appreciated that the output mirror partially transmits the light generated within the laser cavity. As a result, a portion of the beam exits the device. This exiting beam constitutes the useable laser beam.

FIG. 6 is a representative coating curve of optics which fall within the scope of the present invention. As can be appreciated from FIG. 6, a high percentage of the light in the 530 nm region is transmitted. Conversely, there is relatively little transmission in the 480 nm, 568 nm, and 647 nm regions. Thus, lasing would be produced at 480 nm, 568 nm, and 647 nm, but not at 530 nm.

Importantly, the laser of the present invention results in a coaxial laser output of light of multiple selected wavelengths. This can be appreciated by reference to FIG. 5. Thus, it is possible to use a single laser within the scope of the present invention in place of multiple lasers used in prior applications.

Another important selection criteria for selecting specific output bean characteristics is the gas pressure within the laser tube. By selecting and adjusting the gas pressure within the laser tube it is possible to vary the relative output power of the various output wavelengths. As will be appreciated with reference to Table II below, variation in the pressure directly impacts output.

Gas pressure is generally selected during initial construction of the laser. Selected gases, in the desired relative proportions, are mixed and caused to flow into the laser tube. Premixed gases are forced into the laser tube until such time as the desired pressure is achieved. The laser tube is then sealed for operation.

In an alternative embodiment, the gas reservoir 58 may be filled with a different gas mixture than the mixture used in the laser tube. The gas reservoir 58 may be equipped with a metering valve which may be used to alter the mixture of gases disposed within the laser tube, thereby altering the laser's output. That is, gases within the reservoir 58 are allowed to selectively flow into the laser tube 22 in order to adjust the pressure and gas mixture characteristics within the laser tube 22, and as a result adjust the characteristics of the output beam.

Furthermore, the pressure of the gas within the gas reservoir 58 may be altered by changing the temperature of the gases. In one embodiment, a heater 59 raises the internal reservoir temperature into the 250-300 degree Fahrenheit range, thereby raising the gas pressure. The heater 59 may be a commercially available 50-60 watt heater. When it is desired to adjust the output in the opposite manner, heat is simply removed and the reservoir is allowed to cool.

As a result, the gas reservoir 58 provides additional stability to the device during operation, as well as means for varying pressure within the laser tube. The pressure of the gas is stabilized by the additional volume provided by the attached reservoir, which volume is significantly greater than the volume of the laser tube 22. Accordingly, better long term performance and stability is achieved, as well as providing additional means for controlling pressure within the laser tube by varying pressure in the auxiliary gas reservoir 58.

Thus, it can be seen that the present invention provides means for adjusting and selecting the pressure of the gas within the laser tube 22, as well as the precise composition of the gas mixture. The pressure and gas mixture is primarily selected upon the initial manufacture of the laser. However, adjustments to the pressure can be made by adjusting the temperature of the gas in the reservoir or the laser tube by means of a heater. Alternatively, the pressure of the gas in the reservoir may be different than the pressure of the gas in the laser tube. Thus, when the interior of the laser tube is placed into fluid communication with the interior of the reservoir it is possible to make adjustments in gas pressure and relative mixture.

As discussed above, the present invention differs from conventional ion lasers in that multiple gases are employed in order to produce multiple selected colors within the output laser beam. For example, argon is known to produce a significant blue output at about 488 nm. This blue output is desirable and useful for numerous applications. At the same time, krypton is known to produce desirable and useful yellow (568 nm) and red (647 nm) laser output, as well a weaker blue output at 482 nm and 476 nm. The percentage of the various gases is carefully selected at the time the laser tube is charged with gas, and may be adjusted in the manner discussed above after initial manufacture.

Figure 7:
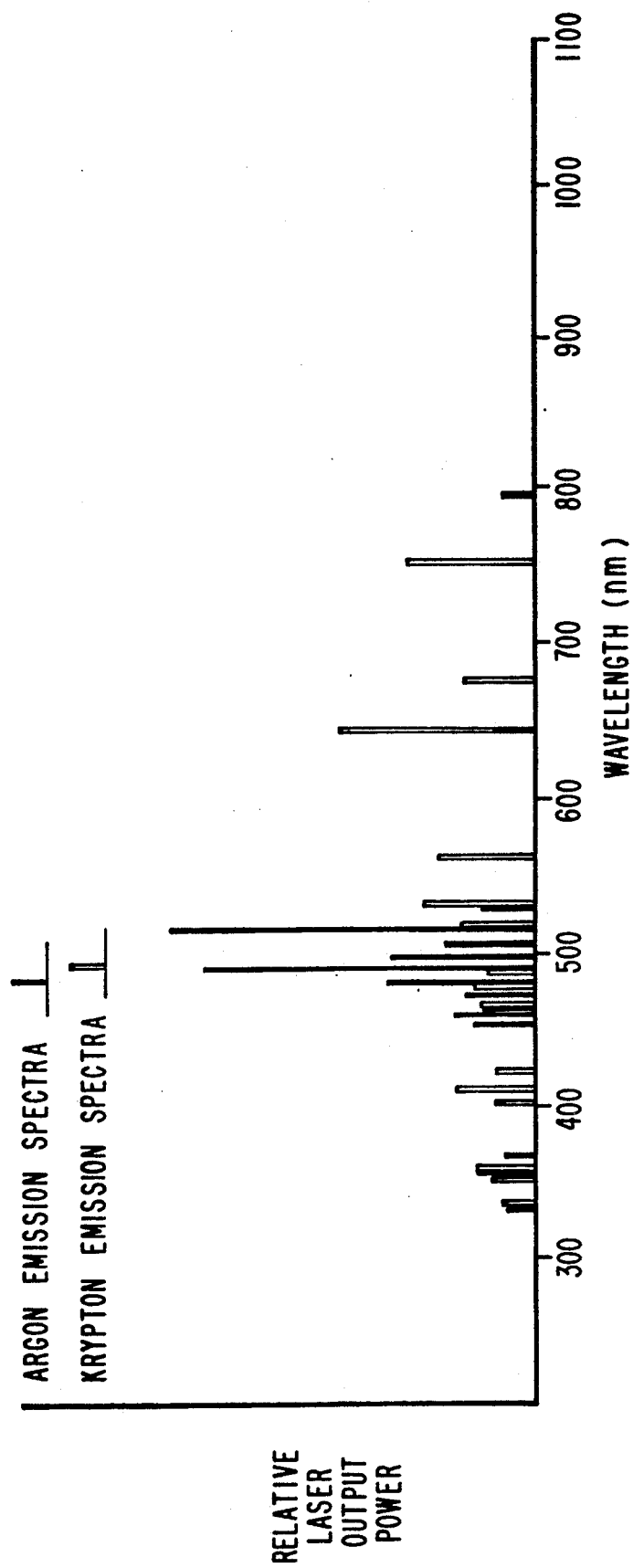
FIG. 7 is a graph illustrating the emission spectra of krypton and argon.
Figure 9:
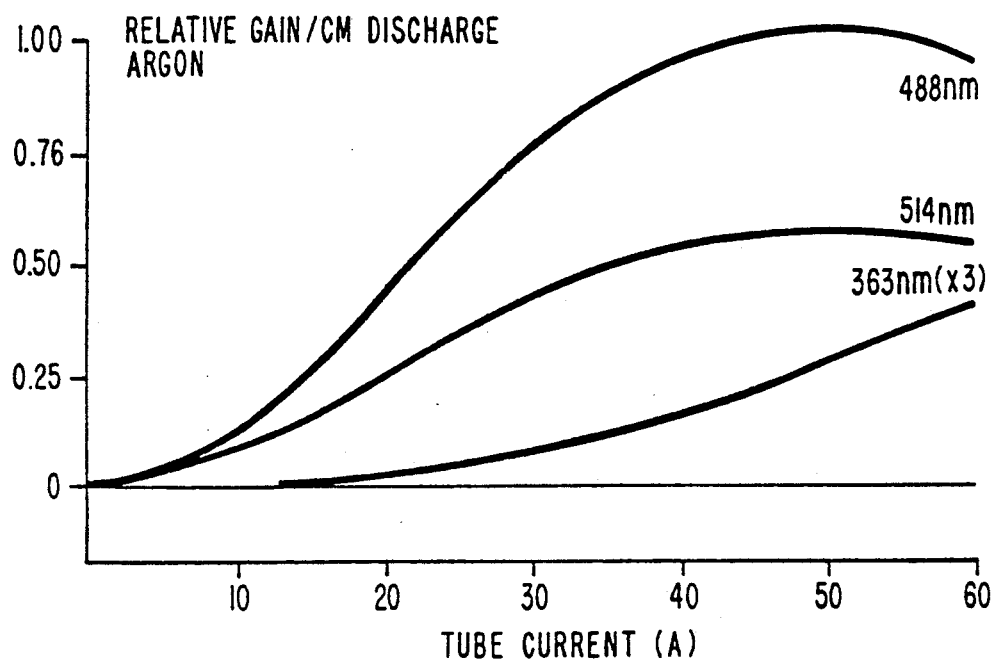
FIG. 9 is a graph illustrating the reflective gain discharge curve for argon.
Figure 8:
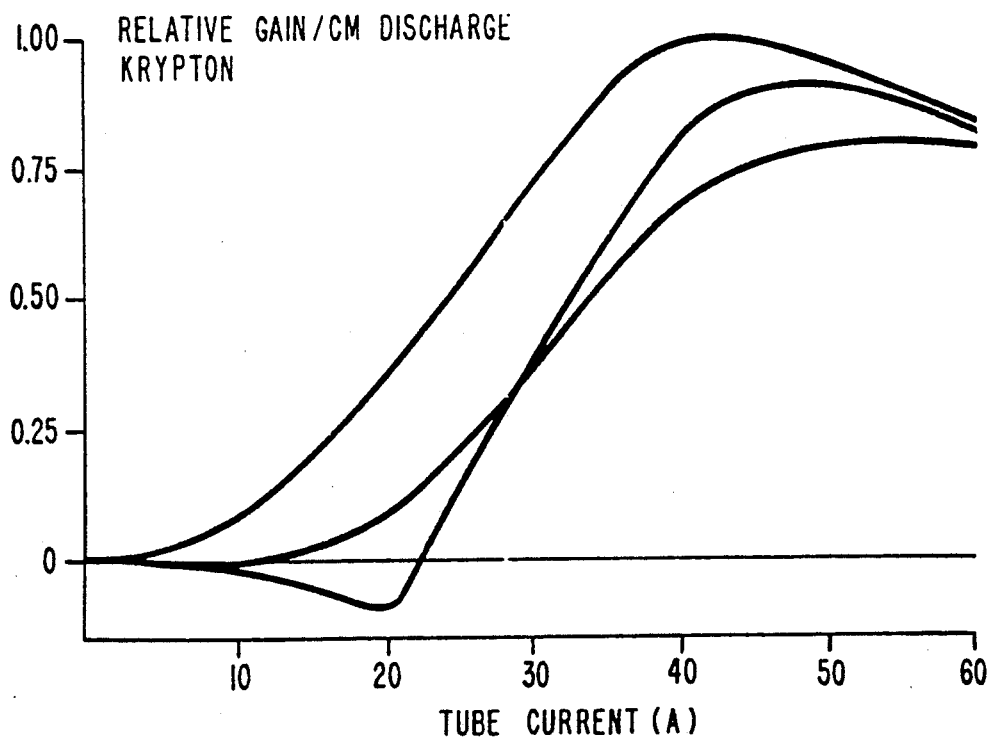
FIG. 8 is a graph illustrating the reflective gain discharge curve for krypton.

For purposes of background, Table I and FIG. 7 show the representative outputs of argon and krypton lasers. The relative gain/discharge of a typical krypton laser is illustrated graphically in FIG. 8. The relative gain/discharge of a typical argon laser is illustrated graphically in FIG. 9. Thus, the present invention teaches the combination of multiple gases, such as krypton and argon, in the laser tube, in order to avoid the necessity of using two lasers to produce, for example, both a strong blue and additional red and/or yellow output.

TABLE I

| Representative Outputs | |
|---|---|
| Wavelength (um) | Power (mW) |
| Nominal 4 W argon laser | |
| 0.5145 | 1400 |
| 0.5017 | 200 |

TABLE I-continued

Representative Outputs

| Wavelength (um) | Power (mW) |
|---|---|
| 0.4965 | 300 |
| 0.4880 | 1300 |
| 0.4765 | 500 |
| 0.4727 | 100 |
| 0.4658 | 50 |
| 0.4579 | 150 |
| 0.3511, 0.3638 | 100 (with special mirrors) |

Nominal 750 mW krypton laser

| | |
|---|---|
| 0.6471 | 300 |
| 0.5682 | 130 |
| 0.5309 | 100 |
| 0.5208 | 100 |
| 0.4825 | 50 |
| 0.4762 | 70 |
| 0.3507, 0.3564 | 200 (with special mirrors) |

In the present invention it has been found that mixtures of krypton and argon within a fairly broad range produce acceptable results. The precise mixture composition chosen will depend upon the desire output and the specific operating environment. It is generally found that argon in the range of from approximately 30% to approximately 45% of the total argon-krypton mixture produces acceptable results for most applications. It is found that by increasing the percentage of argon in the mixture, the blue output is increased, while the yellow and red output is decreased. Similarly, when the percentage of argon in the mixture is decreased, the yellow and red output is increased and the blue output is decreased. Thus, variation of the percentage mixture represents one method of adjusting the output of the laser. In addition, since argon is less conductive than krypton, increasing the percentage of argon in the mixture also results in a less conductive gas mixture.

Table II illustrates some representative data obtained employing the present invention. It can be seen that variation of the pressure in the laser tube has a direct impact on which color(s) predominate. For example, reduction of the pressure generally results in an increase in the 476–488 nm blue bands, as a proportion of total output. Thus, if more blue is desired, pressure in the laser tube can be decreased. If less blue is desire, pressure in the tube can be increased.

Table II also indicates that variation in current can also result in a variation in the output. Thus, varying the voltage/current is another direct method of adjusting the device to produce a desired mixture of output frequencies and output powers.

Table II also indicates that by proper adjustment and selection of the operating parameters, it is possible to achieve red, yellow, and blue outputs of approximately equal output power. As was discussed above, equal output powers in the 5 mW range (i.e. from about 4 mW to about 8 mW) are often desired. From Table II it can be seen that this is achievable at a number of different pressures, concentrations, and voltages using the present invention.

TABLE II

Representative Experimental Results

| Pressure (torr) | Voltage (anode-cathode) | Current (amps) | 647 nm | 568 nm | 476–488 nm |
|---|---|---|---|---|---|
| | | | (output in milliwatts) | | |
| Percentage argon--30% | | | | | |
| 1.676 | 91.3 | 10.00 | 11.2 | 6.3 | 2.8 |
| 1.500 | 90.4 | 10.00 | 9.2 | 7.4 | 3.7 |
| 1.400 | 89.3 | 10.00 | 8.5 | 8.9 | 4.4 |
| 1.300 | 88.4 | 10.00 | 7.0 | 9.8 | 5.1 |
| 1.200 | 87.2 | 10.00 | 5.9 | 10.4 | 5.1 |
| 1.100 | 87.6 | 10.00 | 3.5 | 9.9 | 5.5 |
| Percentage argon--40% | | | | | |
| 2.200 | 99.7 | 10.00 | 6.2 | 0.4 | 3.4 |
| 2.100 | 99.6 | 10.00 | 7.3 | 1.0 | 4.1 |
| 2.000 | 99.6 | 10.00 | 7.3 | 2.1 | 4.6 |
| 1.900 | 98.5 | 10.00 | 7.0 | 3.3 | 6.0 |
| 1.800 | 97.8 | 10.00 | 6.7 | 4.1 | 6.5 |
| 1.700 | 96.9 | 10.00 | 6.7 | 5.0 | 6.5 |
| 1.600 | 96.6 | 10.00 | 6.0 | 5.7 | 7.6 |
| 1.500 | 95.6 | 10.00 | 5.1 | 6.8 | 9.2 |
| 1.798 | 95.8 | 10.2 | 10.9 | 6.5 | 18.6 |
| 1.801 | 92.8 | 9.0 | 7.8 | 5.9 | 11.9 |
| 1.788 | 91.0 | 8.0 | 4.8 | 5.0 | 7.4 |
| 1.783 | 90.5 | 7.7 | 4.1 | 4.6 | 6.3 |
| 1.794 | 96.2 | 10.00 | 12.3 | 5.0 | 15.7 |
| 1.778 | 92.2 | 8.00 | 5.1 | 3.6 | 6.3 |
| 1.781 | 91.6 | 8.00 | 5.0 | 4.3 | 6.6 |
| 1.779 | 91.2 | 8.00 | 4.6 | 4.6 | 7.2 |
| 1.779 | 91.0 | 8.00 | 4.7 | 4.7 | 7.2 |

In summary, Table II shows that by varying the pressure, voltage/current, and the relative percentages of argon and krypton, output can be varied within predictable and desirable ranges. In the data presented, essentially all of the outputs measured were within the range needed for usable output beams of the selected wavelengths for most applications.

In one embodiment of the device, the laser tube is designed to operate in TEMoo mode and to provide a polarized output beam. The laser tube is housed in an aluminum resonator structure of the typed described above. Laser head cooling is accomplished by using two high volume fans as illustrated above. Beam diameter 1/e2 is 0.65 mm and beam divergence is 0.95 mrad. Full angle polarization is less than 100:1 and mode, as mentioned above, is TEMoo.

In summary, the present invention provides a mechanism for producing multiple colors of laser light while avoiding the problems encountered in the art. The present invention also provides a single ion laser that is able to produce multiple specific wavelengths of coaxial light output. The present invention also produces a laser that does not require complex and tedious alignment procedures in order to produce the desired multiple light wavelengths. The present invention provides a device that is capable of eliminating unwanted light wavelengths. The present invention also provides influence over three of the principal parameters which control the output of an ion gas laser, namely, the gas pressure, the discharge current and voltage, and the composition of the gas mixture.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A constant output ion laser producing laser output beams containing more than one predetermined wavelength, each said wavelength having an output power within a predetermined range, said ion laser comprising:
an ion laser tube, said ion laser tube containing a mixture of at least two gases;
optical means disposed along at least one optical axis and defining an optical cavity, said optical cavity bounding at least a portion of said gas mixture;
means for simultaneously exciting said at least two gases contained within said optical cavity sufficiently to produce a continuous laser output at at least two selected wavelengths; and
means for controlling the output power of each of said predetermined wavelengths, said means for controlling the output power of each of said predetermined wavelengths comprising adjusting one or more of the pressure within said laser tube, the operating current of said laser, and the relative percentages of each of said gases contained within said laser tube.

2. A constant output ion laser as defined in claim 1 wherein said gases comprise argon and krypton.

3. A constant output ion laser as defined in claim 2 wherein argon comprises from about 30% to about 45% of the total gaseous mixture.

4. A constant output ion laser as defined in claim 2 wherein krypton comprises from about 55% to about 70% of the gaseous mixture.

5. A constant output ion laser as defined in claim 1 wherein said optical means comprise optics that are substantially transmissive of unwanted wavelengths.

6. A constant output ion laser as defined in claim 5 wherein said optics transmit more than approximately 10% of said unwanted wavelengths.

7. A constant output ion laser as defined in claim 1 wherein said laser produces coaxial output beams in the red, yellow, and blue wavelengths ranges.

8. A constant output ion laser as defined in claim 1 wherein said predetermined light wavelengths comprising at least one red frequency, at least one yellow frequency, and at least one blue frequency.

9. A constant output ion laser as defined in claim 1 wherein the output power of each of said wavelengths is in the range of from about 4 mW to about 8 mW.

10. A mixed gas ion laser comprising:
a laser tube containing a mixture of at least two noble gases, said gases being chosen such that upon excitation, photons of at least two predetermined wavelengths are emitted;
an optical cavity bounded by optics such that if the gases within the laser tube are sufficiently excited, lasing occurs within the optical cavity at said predetermined wavelengths;
means for exciting the gases within the laser tube sufficiently that lasing occurs, said exciting means operating on direct current such that a constant output of laser light is produced; and
means for selecting the output power of said laser such that light at said predetermined wavelengths is emitted from said laser within predetermine power ranges, said means for selecting output power comprising selecting the ratio of said noble gases to one another within said laser tube, selecting the pressure of said noble gases within said laser tube, and selecting the operating voltage of the laser.

11. A mixed gas ion laser as defined in claim 10 wherein said gases comprise argon and krypton.

12. A mixed gas ion laser as defined in claim 11 wherein argon comprises from about 30% to about 45% of the total gaseous mixture.

13. A mixed gas ion laser as defined in claim 11 wherein krypton comprises from about 55% to about 70% of the gaseous mixture.

14. A mixed gas ion laser as defined in claim 10 wherein said optical means comprise optics that are substantially transmissive of unwanted wavelengths.

15. A mixed gas ion laser as defined in claim 14 wherein said optics transmit more than approximately 10% of said unwanted wavelengths.

16. A mixed gas ion laser as defined in claim 10 wherein said laser produces coaxial output beams at selected wavelengths.

17. A mixed gas ion laser as defined in claim 10 wherein said predetermined light wavelengths comprising at least one red frequency, at least one yellow frequency, and at least one blue frequency.

18. A mixed gas ion laser as defined in claim 10 wherein the output power of each of said wavelengths is in the range of from about 4 mW to about 8 mW.

19. A mixed gas ion laser as defined in claim 10 wherein said means for exciting the gases within the laser tube comprises an anode and a cathode.

20. A mixed gas ion laser as defined in claim 19 wherein said cathode is heated by direct current.

21. A mixed gas ion laser as defined in claim 10 further comprising an auxiliary gas compartment in fluid communication with said laser tube.

22. A mixed gas ion laser as defined in claim 21 further comprising means for heating the auxiliary gas compartment 23. An ion laser for emitting light of more than one color comprising:
an ion laser tube containing a mixture of at least two gases;
optical means disposed along at least one optical axis and defining an optical cavity, said optical cavity bounding at least a portion of said gas mixture;
means for exciting said at least two gases comprising a direct current power supply, said exciting means resulting in a continuous output of laser light at at least two wavelengths;
means for controlling the output power of each said wavelengths comprising means for selecting the gas pressure within the laser tube, means for selecting the mixture of the gases within the laser tube, and means for selecting the direct current provided for exciting said gases.

24. A method for producing a constant ion laser output containing more than one predetermined wavelength, each said wavelength having an output power within a predetermined range, said method comprising the steps of:
providing an ion laser comprising an ion laser tube, said ion laser tube containing a mixture of at least two gases; optical means disposed along at least one optical axis and defining an optical cavity, said optical cavity bounding at least a portion of said gas mixture; and means for simultaneously exciting said at least two gases contained within said optical cavity sufficiently to produce a continuous laser output at at least two selected wavelengths; and
controlling the output power of each of said predetermined wavelengths, by selecting the output power of each of said predetermined frequencies by selecting one or more of the pressure within said laser tube, selecting the current voltage of said laser, and selecting the relative percentages of each of said gases contained within said laser tube.

* * * * *